Feb. 6, 1934. M. B. MORGAN 1,946,093
AUTOMOTIVE AXLE
Filed April 11, 1932

INVENTOR:
Mathew B. Morgan
by Carr & Carr & Gravely
His Attorneys

Patented Feb. 6, 1934

1,946,093

UNITED STATES PATENT OFFICE 1,946,093

AUTOMOTIVE AXLE

Mathew B. Morgan, Detroit, Mich., assignor to The Timken-Detroit Axle Company, Detroit, Mich., a corporation of Ohio Application April 11, 1932. Serial No. 604,427

6 Claims. (Cl. 74—99)

This invention relates to differential driving axle constructions for automotive vehicles. It has for its principal object to provide simple and efficient means for adjusting and holding in proper position the parts of the antifriction bearings which rotatably support the differential gear casing and for properly positioning the ring gear of said differential gear case with reference to the gear for driving said ring gear. Other objects are to provide for cheapness of construction and to produce a strong, compact and durable axle. The invention consists in the differential driving axle construction and in the parts and in the arrangements and combinations of parts hereinafter described and claimed.

Figure 1:
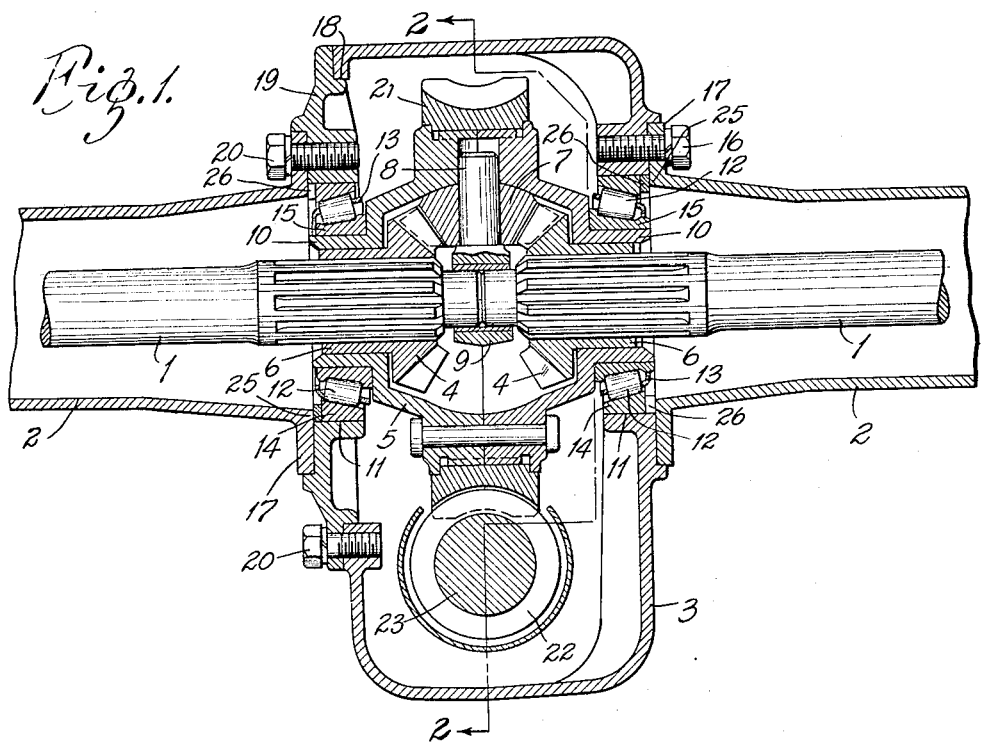
Figure 2:
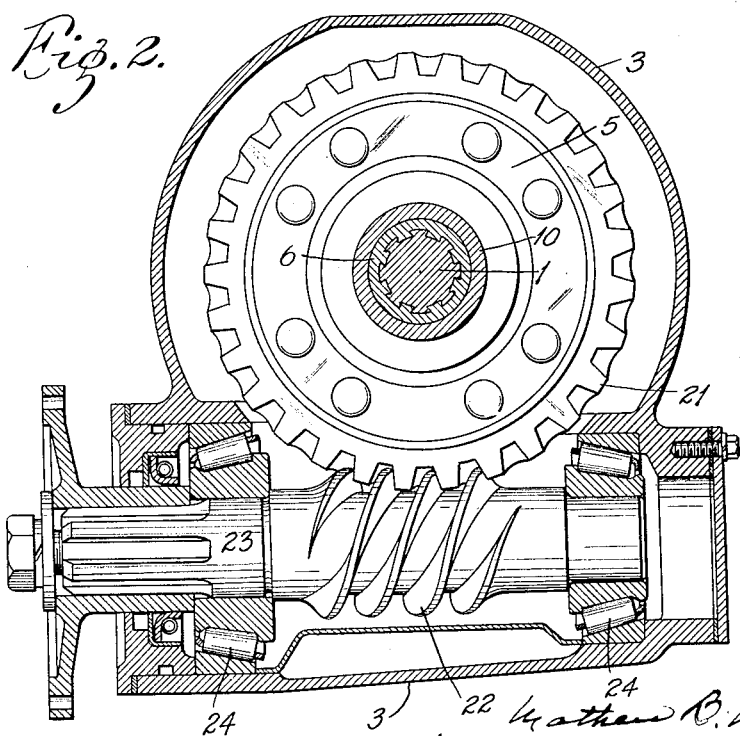

In the accompanying drawing, which forms part of this specification and wherein like symbols refer to like parts wherever they occur, Fig. 1 is a vertical central longitudinal section through an automotive differential driving axle construction embodying my invention; and Fig. 2 is a vertical transverse section through said driving axle construction on the line 2—2 in Fig. 1.

Referring to the accompanying drawing, my invention is shown in connection with a worm drive differential driving axle construction having an underhung worm. Said axle construction comprises axially alined axle shaft sections 1 connected together at their inner ends by a differential mechanism all enclosed in a load supporting housing or casing consisting of two tubular end members 2 connected together by an enlarged intermediate member 3 that constitutes a housing for the differential mechanism.

The differential mechanism comprises two opposed bevel side gears 4 that are located in a casing 5 with their hubs 6 splined on the inner ends of the respective axle shaft sections 1. Interposed between and intermeshing with the opposed bevel side gears 4 are bevel pinions 7 that are journaled on the radially extending studs 8 of a spider 9 that is arranged to rotate with the differential gear case 5. The differential gear case has axially alined hubs 10 projecting from its ends adapted to receive and rotatably support the hubs 6 of the respective side gears 4.

The hubs 10 of the differential gear case 5 are journaled in suitable antifriction bearings that are mounted in circular openings 11 provided therefor in the ends of the enlarged intermediate member or section 3 of the load supporting axle housing. As shown in the drawing, each of these antifriction bearings comprises a series of conical rollers 12 that are assembled in a suitable cage 13 and are interposed between a conical cup or outer raceway member 14 mounted in the opening 11 in one end of the middle member or section 3 of the axle housing and a cone or inner raceway member 15 that is mounted on the hub 10 on the adjacent end of the differential gear case 5. The bearings are preferably arranged in said openings with the larger ends of their conical bearing rollers facing inwardly. The end members 2 of the axle housing are detachably secured to the opposite ends of the intermediate member 3 of said axle housing preferably by means of cap screws 16 that pass through outstanding flanges 17 on the inner ends of said end members and are threaded into the end walls of said intermediate member. One end wall of the enlarged intermediate member of the axle housing has an opening 18 therein concentric with the axle shafts, and only slightly larger in diameter than the worm gear ring 21, whereby the entire differential mechanism, including said worm gear ring 21, may be inserted in and withdrawn from said intermediate member. The end wall having the gear receiving opening 18 therein has an annular closure member 19 removably secured thereto by cap screws 20. This annular closure member forms part of the end wall to which it is secured; and the opening in said member forms the bearing supporting opening 11 in said end wall.

The gearing for driving the differential gearing preferably comprises a worm gear ring 21 mounted on the differential gear case 5 and an underhung worm 22 formed on a driving or propeller shaft 23 that is journaled in suitable antifriction bearings 24 mounted in the openings provided therefor in the lower portion of the enlarged intermediate member 3 of the axle housing.

The bearing receiving openings 11 in the end walls of the enlarged intermediate member 3 of the axle housing are made of slightly larger diameter than the diameters of the openings in the inner adjacent ends of the end members 2 of said axle housing, thereby forming annular shoulders 25 opposite the large ends of the conical cups or outer raceway members 14 of the conical bearings that rotatably support the hubs 6 of the differential gear case 5. Fitting between the shoulders 25 formed by the inner ends of the end members 2 of the axle housing and the large ends of the conical cups 14 located opposite said shoulders are shims or washers 26 of whatever thickness that is required to hold the antifriction bearings for the differential gear case and the ring gear on said differential gear case in proper position. In the event that wear of the parts in service causes excessive end play of the bearings for supporting the differential gear case, said bearings and said differential gear case may be again properly adjusted and positioned by substituting thicker washers or shims for the original washers or shims 26. The operation of replacing the shims 26 is a simple one, which consists merely in disconnecting the end members 2 of the axle housing from the intermediate member 3 thereof and pulling said end members, together with the axle shaft sections, far enough away from said intermediate section to permit access to be had to the shims. It is noted that such adjustment is obtained without removing any of the parts from the enlarged intermediate member of the axle housing. The shims 26 are preferably split shims that are snapped in place in the bearing receiving openings 11 in the end walls of the enlarged intermediate member 3 of the axle housing.

It is obvious, from the foregoing description, that the work of mounting and adjusting the parts is greatly simplified by my invention in comparison with the practice heretofore customary. It is also obvious that the present construction is more compact and strong and less liable to get out of order than the earlier constructions. It is also obvious that the invention is applicable to bevel gear driven axle constructions as well as to worm gear driven axle constructions.

What I claim is:

1. An automotive driving axle construction comprising an axle housing, axle shaft sections therein, said axle housing comprising intermediate and end members detachably connected together endwise with their adjacent faces in direct contact, said intermediate member having openings in its ends, differential gearing connecting the inner ends of said axle shaft sections, a casing for said gearing enclosed within the intermediate member of said axle housing, antifriction bearings mounted in the openings in said intermediate member for rotatably supporting the casing in the intermediate member of said axle housing, and replaceable shims mounted entirely within said openings between and in contact with said antifriction bearings and the inner ends of the end members of said axle housing.

2. An automotive driving axle construction comprising a load supporting housing, axle shaft sections therein, said housing comprising intermediate and end members detachably secured together endwise with the inner ends of the end members in direct contact with the ends of the intermediate member, differential gearing connecting the inner ends of said driving axle sections, a casing for said gearing enclosed within the intermediate member of said housing, said intermediate member having openings in its ends, conical roller bearings mounted in the openings in the ends of said intermediate member of said housing and rotatably supporting the differential gear casing therein, and split ring shims mounted entirely within said openings between and in contact with said conical roller bearings and the inner ends of the end members of said housing.

3. An automotive driving axle construction comprising a load supporting housing, axle shaft sections therein, said housing comprising an enlarged intermediate member and end members detachably secured to the opposite ends of said enlarged intermediate member in direct contact therewith, differential gearing operatively connecting the inner ends of said axle shaft sections, a casing for said gearing enclosed within the enlarged intermediate member of said housing, said enlarged intermediate member having openings in its ends concentric with and of larger diameter than the openings in the inner ends of the end members of said housing, whereby said end members form shoulders opposite the outer ends of the openings in the ends of said intermediate member, antifriction bearings mounted in the openings in the ends of said intermediate member for rotatably supporting differential gear casing therein, said antifriction bearings including raceways, and replaceable shims mounted entirely within said openings between and in contact with said raceway members and the shoulders formed by the inner ends of the end members of said housing.

4. An automotive driving axle construction comprising a load supporting housing, axle shaft sections therein, said housing comprising an enlarged intermediate member and two end members detachably secured to the opposite ends of said intermediate member in direct contact therewith, differential gearing operatively connecting the inner ends of said axle shaft sections, a casing for said gearing enclosed within the enlarged intermediate member of said housing, a gear secured to the differential gear casing, said intermediate member having openings in its end walls, conical roller bearings mounted in said openings in said intermediate member for rotatably supporting said differential gear therein, said conical roller bearings including conical raceways arranged with their larger ends facing outwardly and said end members of said housing having portions located opposite said larger ends of said raceways, and replaceable shims mounted entirely within said openings between and in contact with the large ends of said raceways and the portions of the end members located opposite to said large ends of said raceways.

5. An automotive driving axle construction comprising a load supporting housing, axle shaft sections therein, said housing comprising an enlarged intermediate member and end members detachably secured to the opposite ends of said intermediate member in direct contact therewith, differential gearing operatively connecting the inner ends of said axle shaft sections, a casing for said gearing enclosed within the enlarged intermediate portion of said housing, a gear secured to the differential gear casing, a gear journaled in the intermediate member of said housing for driving said gear, said intermediate member having openings in its ends, conical roller bearings mounted in said openings in said intermediate member for rotatably supporting said differential gear casing therein, said conical roller bearings being insertable in and removable from said openings through the outer ends thereof, said conical roller bearings including conical outer raceway members mounted in the openings in said intermediate member with their larger ends facing outwardly, said end members forming shoulders opposite the large ends of said outer raceways, and replaceable shims mounted entirely within said openings between and in contact with said shoulders and the large ends of said outer raceways for holding in proper position the parts of said bearings and for holding the gear on the differential gear case in proper position with relation to the driving gear therefor.

6. An automotive driving axle construction comprising a load supporting housing, driving shaft sections therein, said housing comprising an enlarged intermediate member and two end members detachably secured to the opposite ends of said enlarged intermediate member in direct contact therewith, differential gearing operatively connecting the inner ends of said driving shaft sections, a casing for said gearing enclosed within the enlarged intermediate member of said housing, a gear secured to the differential gear casing, an opening in one end of said intermediate member slightly larger in diameter than the diameter of said gear and through which said differential gear casing is adapted to be inserted in and removed from said intermediate member, a closure member for said opening and detachably secured to said intermediate member, said intermediate member having openings in its opposite ends, one of said openings being formed in said closure member, antifriction bearings mounted in said last mentioned openings for rotatably supporting said differential gear casing in said intermediate member, and replaceable shims mounted entirely within the bearing receiving openings in one end of said intermediate member and in said closure member between and in contact with said antifriction bearings and the inner ends of said end members.

MATHEW B. MORGAN.